ered Apr. 18, 1961

United States Patent Office

2,980,584

PARENTERAL MAGNESIUM OXYTETRACYCLINE ACETIC OR LACTIC ACID CARBOXAMIDE VEHICLE PREPARATION

Henry F. Hammer, Seaford, N.Y., assignor to Chas. Pfizer & Co., Inc., New York, N.Y., a corporation of Delaware No Drawing. Filed Oct. 29, 1957, Ser. No. 692,998

5 Claims. (Cl. 167—65)

This invention is concerned with new and novel liquid antibiotic compositions adapted for parenteral administration. Specifically, the invention is concerned with oxytetracycline solutions adapted for intramuscular or intravenous use. These solutions are remarkably stable at certain hydrogen ion concentrations, and are comprised of the antibiotic and a metal salt dissolved in an aqueous lower aliphatic carboxamide. These preparations possess unique advantages and represent a definite improvement over prior compositions both with regard to shelf stability and compatibility with the tissues on intramuscular injection.

Although oxytetracycline may be injected intramuscularly as the base or as an acid addition salt with the achievement of antibiotic blood levels in the system, it has been found that appreciable irritation often accompanies such injections and particularly if repeated injections are made at the same point or at places close to the original injection. Furthermore, there is a tendency for residual material to remain in the muscle at the side of injection for considerable periods. This is definitely an undesired effect since it results in the formation of fibrous tissue and necrosis. These disadvantages have been overcome to a substantial degree by the use of dry solid formulations for reconstitution containing the antibiotic with local anesthetics and certain inorganic salts to improve the degree of absorption and reduce the irritation caused by the antibiotic. Such formulations are, however, stable for only short periods of time when dissolved in water and, therefore, solutions thereof must be prepared by the physician immediately prior to use. While such a mode of administration is adequate, it is quite inconvenient, and in addition use under adverse circumstances provides opportunity for contamination by dirt or microorganisms as well as for error. In order to overcome these disadvantages, solutions of oxytetracycline in various vehicles have been suggested in the past but none has been satisfactory from the standpoint of tissue irritation, absorption on intramuscular injection, and shelf stability.

An object of the present invention, therefore, is to provide stable solutions of oxytetracycline which are non-irritating upon intramuscular injection and from which the antibiotic activity is readily absorbed into the blood stream of the animal organism. Further objects will be apparent from the following disclosure.

It has now been found that aqueous solutions containing a substantial proportion of a physiologically acceptable, water soluble, lower aliphatic amide provide remarkably stable oxytetracycline solutions having relatively high concentrations of antibiotic when precise proportions of a divalent metal salt and a pH of at least about 8.5 is employed. It is thought that this remarkable stability advantage over other solutions having relatively slight differences in composition and pH is due to the formation of a specific oxytetracycline metal complex. This complex is thought to have the composition of three molecules of oxytetracycline to two atoms of metal and two molecules of the base employed in adjusting the pH. Useful neutralizing agents include ammonia and the physiologically acceptable lower aliphatic water soluble amines having dissociation constants greater than about $10^{-6}$ whose salts of the oxytetracycline complex formed are soluble in the vehicle employed. Weaker bases are not satisfactory since they do not form the required complex salts. Metal hydroxides and basic salts are less desirable since they frequently yield antibiotic complex salts which are not sufficiently soluble in the vehicle and also involve the injection of additional metal ions. For example, sodium hydroxide leads to the formation of a precipitate, which is thought to be the disodium salt of the oxytetracycline complex, when it is attempted to prepare a solution having an oxytetracycline concentration of 50 mg./kg. More dilute solutions can, however, be prepared satisfactorily. The proportion of divalent metal, as a physiologically acceptable salt to be employed in the composition, is determined by a series of simple experiments to select the proportion having satisfactory solubility. Magnesium chloride is the preferred metal salt for use in the present compositions since no adverse physiological effects result from its injection, and a stable, pharmaceutically elegant preparation is obtained. Two thirds of a mole of this and other magnesium salts per mole of oxytetracycline is required. Some variation from this precise ratio is possible up to about an equimolar amount. Thus, the range of 0.67 to 1.0 molar equivalents of magnesium salt per mole of oxytetracycline is operative.

Anions other than the chloride, that is magnesium salts other than magnesium chloride, can be employed. It is only necessary that the salt provide a clear solution and that, of course, the anion be physiologically acceptable, compatible in solution with the oxytetracycline, and stable at the pH of the composition. Satisfactory results are achieved by substituting the gluconate, acetate, sulfate, glucoheptanate, phosphate, etc. for the chloride. By appropriate adjustment of the vehicle amide concentration, pH, and metal/salt-antibiotic ratio, the corresponding calcium, zinc, aluminum, and manganese salts can be substituted for magnesium chloride.

The vehicle of the unique compositions of the present invention is an aqueous solution of a physiologically acceptable lower aliphatic carboxamide and preferably an amide of acetic or lactic acid. The carboxamide has a concentration in the range of 25 to 80% by weight of the vehicle, the preferred value being 50% by weight. At lower concentrations, the solubility and stability of the antibiotic is reduced. At amide concentrations exceeding 80%, the solvent becomes irritating and not well tolerated on injection. At the preferred value of 50% by weight of carboxamide, the vehicle has excellent solvent characteristics at the desired pH for the antibiotic and salts involved in the composition and the composition is also well tolerated upon intramuscular injection. This vehicle can also be employed intravenously when the concentrated preparation is diluted with an appropriate quantity of saline or other diluent used in intravenous therapy. Suitable amides for the vehicles of the present compositions include N,N-diethylacetamide, N,N-dimethylacetamide, acetamide, N($\beta$-hydroxyethyl)acetamide, and N-($\beta$-hydroxyethyl)lactamide. In general, any of the lower aliphatic carboxamides can be employed so long as they are not toxic, are not irritating, and are solvents for the oxytetracycline and salts of the composition. In general, the latter causes no difficulty, but the question of physiological compatibility must be carefully evaluated, considering as well prevailing governmental restrictions on the contents of parenteral drugs.

One of the difficulties encountered with aqueous liquid compositions of oxytetracycline is discoloration and loss of potency which appears to be due in part to oxidative degradation. This problem is particularly aggravated with aqueous solutions, but is also occasionally encountered with aqueous suspensions. In order to avoid this difficulty, oxidizing conditions must be avoided during storage of the present product. To this end, oxygen is excluded from the finished solution and antioxidants are sometimes included in the solution. Antioxidants are not necessary if oxygen has been rigorously excluded by maintaining the product in an inert atmosphere such as an atmosphere of nitrogen, helium, or other non-oxidizing, non-reactive gas. Carbon dioxide is a non-oxidizing gas useful in many such operations but it is not satisfactory in the present case due to the alkaline pH of the solution. Formation of carbonate salts of the basic agents that are employed in adjusting the pH of the composition may occur.

As a practical matter, it is convenient to employ antioxidants in addition to manufacturing and storing the product in an inert atmosphere. Satisfactory antioxidants are those which are physiologically acceptable for use in parenteral drug products and those which are, of course, compatible with oxytetracycline. Examples of suitable antioxidants include sodium bisulfite, sodium metabisulfide, and sodium formaldehyde sulfoxylate. Sodium ascorbate which is physiologically acceptable as an antioxidant, is not sufficiently stable at the pH employed. Concentrations of the above antioxidants which are effective and still in accordance with governmental regulations for parenteral products are employed in the present formulation. For example, sodium bisulfite is employed in about 0.1% concentration. Generally from about 0.05 to 0.2% concentrations of antioxidant are employed.

The novel compositions of the present invention are prepared by mixing the oxytetracycline, preferably in the amphoteric form but alternatively as an acid addition salt, and the magnesium chloride; magnesium chloride hexahydrate is a convenient form to employ, in water or the aqueous amide mixture of approximately one-half of the final volume of vehicle to be employed. When water is employed, the amide component is then added to the aqueous solution in appropriate quantity. The pH of the mixture is then adjusted to about 8.5 with ammonia or a physiologically acceptable lower aliphatic amine, preferably ethanolamine. The pH of the final composition is critical as is the metal salt concentration. The pH must be at least about 8.5 in order to effect solution of all the components. This is, in fact, the preferred pH. Higher pH's also provide stable solutions but as the pH is increased above about 9.5, the physiological compatibility of the product with the muscle tissue is decreased. Slightly lower or slightly higher pH's may be employed but the satisfactory range is substantially from 8.5 to 9.5. A great variety of lower aliphatic primary, secondary, and tertiary amines having up to about 6 carbon atoms per group attached to the amino nitrogen atom, can be used for the neutralization step including ethanolamine, diethylamine, ethylamine, triethanolamine, diethanolamine, arginine, glucosamine, etc. The finished composition must, of course, be sterile. Thus, sterile components and conditions of manufacture are employed, or alternatively, the solution itself is sterilized, for instance, by filtration as a final stage of manufacture. The latter offers a number of practical advantages.

The use of an acid addition salt of the antibiotic such as oxytetracycline hydrochloride, oxytetracycline phosphate, oxytetracycline nitrate, etc. in preparing the present compositions is satisfactory. However, they require a larger amount of neutralizing agent with the accompanying formation of a larger quantity of the by-product acid addition salt of the neutralizing agent. This excess material performs no physiological function and, therefore, it is preferred to use the amphoteric antibiotic and keep the total concentration of the solution to a minimum.

The preferred concentration of oxytetracycline is 50 to 100 mg./ml. when intramuscular injection is the purpose for which the compositions are intended. This is the primary use for which they are adapted. However, they are equally adapted to intravenous administration when diluted with water or diluents employed in intravenous therapy such as isotonic glucose, saline, or Ringer's solution in appropriate quantities. For this use, initial concentrations down to about 10 to 25 mg./ml. of the antibiotic are satisfactory. In preparing these relatively dilute solutions for intravenous therapy, inorganic bases such as sodium hydroxide, sodium carbonate, and sodium phosphate can be used for neutralization.

The dosage of the present compositions is adjusted to provide from 100 mg. to about 500 mg. of oxytetracycline activity per day for the average adult. Similar or reduced doses may be employed in the treatment of children or small animals. Intramuscular injections are limited in volume to from 2 to 4 ml. Thus, the entire daily dose can be administered in one or two injections.

Having described the manner in which my invention is to be practiced, I now provide a series of specific examples thereof which are included to illustrate in greater detail the operation of the present invention. They are, however, not to be considered as limiting the scope of the invention in any way.

Example I

A composition of the present invention containing the following ingredients is prepared in the following fashion.

| | |
|---|---|
| Amphoteric oxytetracycline (assay 910 mcg./mg.) | 22 g. |
| Magnesium chloride hexahydrate | 6 g. |
| Ethanolamine, 20% aqueous | 29 ml. (sufficient to adjust the pH to 8.5). |
| Sodium formaldehyde sulfoxylate | 800 mg. |
| N,N-dimethylacetamide | ca. 180 g. |
| Water, pyrogen free | ca. 180 ml. |

The oxytetracycline and magnesium chloride are mixed with 320 ml. of a 1:1 solution (w./w.) of the dimethylacetamide in water. The pH of this solution is then adjusted to 7.0 with the ethanolamine solution, and the sodium formaldehyde sulfoxylate added. The suspension is then adjusted to pH 8.5 with the remainder of the ethanolamine solution, thoroughly mixed until solution occurs and diluted to 400 ml. with the balance of the 1:1 dimethylacetamide water solution. The finished formulation contains 50 mg./ml. of oxytetracycline activity. The batch is sterilized by filtration, subdivided into 2 ml. portions which are placed in nitrogen-flushed sterile glass ampoules, and sealed in an atmosphere of nitrogen. To insure labeled potency after prolonged storage, a 5% overage is sometimes employed. For use in human patients, it is injected intramuscularly in 2 ml. doses.

This preparation was tested for absorption and tissue irritation in rabbits. Albino rabbits were used in this experiment, each receiving a 1 ml. injection of the composition in the gluteus maximus muscle. The animals were sacrificed 24 hrs. after injection and the muscle examined for irritation and degree of absorption. Gross examination of the degree of absorption was made by noting the amount of injected material remaining in the area of injection. The muscles were then fixed in 10% neutral buffered formalin and examined for lesions by thinly slicing each muscle. The present formulation caused only slight irritation with no gross evidence of any tissue change and only a slight increase in redness of the injected area; 75% or more of the preparation was absorbed in 24 hours. An even higher degree of absorption is obtained by using an additional 10% by weight of magnesium chloride.

Blood level determinations in rabbits were performed to verify the observations regarding absorption. At a dosage of 6.25 mg./kg., a blood serum level of 2.63 mcg./ml. was noticeable after 1 hour. This blood level was maintained then for approximately 5 hours at which time a gradual decrease was observed to 1.5 mcg./ml. 7 hours after injection, and 0.883 mg./ml. after 18 hrs. After 24 hours, a blood level of 0.183 mcg./ml. was detectable. The blood level results are substantially equivalent to those obtained using a commercial oxytetracycline intramuscular preparation comprising a mixture of oxytetracycline hydrochloride and magnesium chloride in the dry condition which was diluted with water prior to injection.

Each of a group of patients was given an intramuscular injection consisting of 2 ml. of the above formulation. Blood samples were then removed, at intervals of 1, 2, 4, 6 and 8 hours following injection and the serum concentration of antibiotic determined. Of 15 patients, the following average values for the blood levels were obtained: 1 hr., 0.917 mcg./ml.; 2 hrs., 1.007 mcg./ml.; 4 hrs., 1.078 mcg./ml.; 6 hrs., 1.020 mcg./ml.; and 8 hrs., 1.166 mcg./ml. A control experiment employing eight patients to which a commercial oxytetracycline formulation was administered was carried out. This commercial formulation consisted of a mixture of oxytetracycline hydrochloride and magnesium chloride which was extemporaneously dissolved in water prior to injection. Blood levels substantially equivalent to those obtained with the formulation of the present invention were observed.

Duplicate samples of this preparation were stored at various temperatures to determine their storage stability. Samples were stored at 50° C. and 37° C. and assayed periodically for their biopotency. The following results were obtained:

| Temperature | Stability Results; Bioassay (mg./ml.) | | | | | |
|---|---|---|---|---|---|---|
| | Initial Assay | 1 Week | 3 Weeks | 6 Weeks | 12 Weeks | 6 Mo. |
| 50° C | 50.3 | 59.2 | 50.0 | 49.8 | 44.2 | 37.8 |
| | 50.7 | 48.8 | 43.1 | 40.7 | | |
| 37° C | 50.3 | | | 51.0 | 47.9 | 48.8 |
| | 50.7 | | 43.2 | | | |

In each preparation, the chemical assay agreed with the biological assay indicating that there was no tendency for the oxytetracycline to epirmerize. Preparations containing an additional 10% by weight of magnesium chloride have still greater stability.

The use of greater than a 1:1 molar ratio magnesium chloride to oxytetracycline and of a pH lower than 8.5 was found to have a remarkably deleterious effect on the stability of this preparation although such formulations were satisfactory from the standpoint of absorption and irritation upon intramuscular injection. Optimum stability is obtained employing about 0.74 mole of magnesium chloride per mole of antibiotic. The loss in stability in a similar preparation but at a different pH and MgCl₂ content is illustrated by the following data obtained for a similar composition containing the following materials:

Oxytetracycline hydrochloride _____ 1.1 g.
Magnesium chloride hexahydrate ____ 1.0 g.
Ethanolamine, 10% aqueous _____ Sufficient to adjust the pH to 6.0.
Sodium bisulfite, 0.5% aqueous _____ 8 ml.
N-(β-hydroxyethyl)lactamide _____ 9.5 g.
Water, pyrogen free _____ q.s. 21 ml.

This material was filled into 2 cc. ampoules which had been flushed with dry nitrogen gas. The following stability data was obtained:

| Temperature | Stability Results; Bioassay (mcg./ml.) | | | | |
|---|---|---|---|---|---|
| | Initial | 1 Week | 4 Weeks | 6 Weeks | 17 Weeks |
| 50° C | 37.0 | 30.9 | 33.3 | 29.4 | 14.0 |
| 37° C | | 35.4 | | 34.8 | 27.0 |

Thus in the 50° study, this sample lost approximately 60% of its original biological activity in 17 weeks. On the other hand, the potency of the composition of the present invention remained within 15% of the original value which is the limit of precision of the assay.

*Example II*

A preparation identical to that of Example I, but containing 6.6 g. of magnesium chloride hexahydrate rather than 6.0 g., was prepared. The exceptional stability of this preparation is borne out by the following tabulation of data obtained in 75° C. storage tests.

| | 75° C. Stability Results; Assay (mg./ml.) | | | |
|---|---|---|---|---|
| | Initial | 1 Week | 2 Weeks | 3 Weeks |
| Bioassay | 50.5 | 43.8 | 39.5 | 36.3 |
| Chemical Assay | 50.2 | 45.8 | 46.0 | 41.5 |

*Example III*

A formulation of the present invention was prepared as follows: oxytetracycline hydrochloride (assay 895 mcg./mg.), 11.2 g., and magnesium chloride hexahydrate, 3 g., was dissolved in 80 ml. of water and 80 g. of N-(β-hydroxyethyl)lactamide was added. The solution was adjusted to pH 8.5 with 20% aqueous ethanolamine and diluted to 200 ml. with 50% aqueous N-(β-hydroxyethyl)lactamide (w./w.) at about pH 7, 0.4 g., of solid sodium bisulfite was added. This solution was then subdivided under nitrogen gas, 2 cc., being placed in each ampoule.

*Example IV*

A preparation as in Example III is prepared employing N,N-diethylacetamide as the diluent. In this instance, a 25% solution of N,N-diethylacetamide in water is prepared and the mixture of oxytetracycline hydrochloride and magnesium chloride is dissolved in approximately 150 ml. of this vehicle. Four hundred mg. of solid sodium metabisulfite is then added and the solution adjusted to pH 8.5 with 20% aqueous diethylamine. The mixture is diluted to 200 ml. with 25% aqueous N,N-diethylacetamide.

*Example V*

A composition is prepared containing the following materials: amphoteric oxytetracycline 22 g., magnesium chloride hexahydrate, 6 g., and sodium formaldehyde sulfoxylate 800 mg. These materials were then mixed with 300 ml. of 80% aqueous N-(β-hydroxyethyl)acetamide, the pH adjusted to 8.5 with aqueous diethanolamine, and the mixture then diluted to 400 ml. with 80% aqueous N-(β-hydroxyethyl)acetamide solution.

*Example VI*

A composition as described in Example I is prepared substituting 60% aqueous acetamide as the vehicle and employing 20% aqueous triethanolamine as the neutralizing agent.

*Example VII*

Compositions as described in Example I are prepared substituting for the magnesium chloride, an equivalent quantity of magnesium acetate, magnesium sulfate, magnesium gluconate, magnesium phosphate, and magnesium glucoheptanate.

Example VIII

The preparation of Example I is repeated employing as the neutralizing agent, aqueous solutions of ammonia, ethylamine, arginine, and glucosamine having concentrations of about 15% by weight or greater.

An alternative method of preparing the compositions of the present invention is to prepare and isolate under sterile conditions the complex (oxytetracycline)$_3$(metal)$_2$B$_2$, and then dissolve it in the sterile aqueous amide vehicle along with the antioxidant. The sterilization can also be conveniently accomplished by filtration of the finished composition. In the above formula, B is the cation of the neutralizing base, the ammonium ion or a substituted ammonium ion. Thus, the pH and metal salt proportion are critical in obtaining the stable complex in solution.

Tetracycline formulations analogous to the oxytetracycline formulations disclosed and exemplified herein are prepared by substitution of tetracycline or an acid addition salt thereof for the oxytetracycline component. In such preparations the pH range of about pH 8.0 to 9.5 is employed and a somewhat higher proportion of metal salt is usually advantageous. Such solutions have stable biopotencies of the order of 60% the charged value due to C-4 epimerization. In therapy, the reduced potency is compensated by use of suitable overages or increased dosage.

What is claimed is:

1. A stable liquid antibiotic composition adapted for parenteral administration comprising, as vehicle, an aqueous solution containing from 25 to 80% by weight of a physiologically acceptable, water soluble, lower aliphatic carboxamide selected from the group consisting of an amide of acetic acid and an amide of lactic acid and dissolved in said vehicle from 10 to 100 mg./ml. of a substance selected from the group consisting of oxytetracycline and an acid addition salt thereof, from 0.67 to 1.0 molar equivalent of a water soluble, physiologically acceptable magnesium salt per mole of oxytetracycline, and sufficient of a water soluble, physiologically acceptable base selected from the group consisting of ammonia and a physiologically acceptable, water soluble lower aliphatic amine having a dissociation constant of greater than $10^{-6}$ to provide said composition with a pH of about 8.5 to 9.5.

2. A composition as claimed in claim 1 wherein the physiologically acceptable salt is magnesium chloride.

3. A composition as claimed in claim 1 wherein the physiologically acceptable salt is magnesium gluconate.

4. A composition as claimed in claim 1 wherein the physiologically acceptable water soluble lower aliphatic carboxamide is N,N-dimethylacetamide.

5. A composition as claimed in claim 1 wherein the physiologically acceptable water soluble lower aliphatic carboxamide is N-($\beta$-hydroxyethyl)lactamide.

References Cited in the file of this patent

UNITED STATES PATENTS

| | | |
|---|---|---|
| 2,516,080 | Sobin et al. | July 18, 1950 |
| 2,640,842 | Weidenheimer et al. | June 2, 1953 |
| 2,671,748 | Crooks | Mar. 9, 1954 |
| 2,736,725 | Ritter | Feb. 28, 1956 |

FOREIGN PATENTS

| | | |
|---|---|---|
| 503,866 | Canada | June 22, 1954 |
| 536,705 | Canada | Feb. 5, 1957 |

OTHER REFERENCES

Putnam et.: Antibiotics and Chemotherapy, vol. 3, No. 12, December 1953, pp. 1183–1186.

Kostenbander: J.A.P.A., Sci. Ed. August 1956, pp. 518–522.

Gans: J.A.P.A., Sci. Ed., Oct. 5, 1957, pp. 587, 591 (esp. p. 589).

Ashton: Chem. and Ind., Sept. 17, 1955, p. 1183.